(12) United States Patent
Schlitter et al.

(10) Patent No.: US 7,449,422 B2
(45) Date of Patent: Nov. 11, 2008

(54) CATALYST, ITS PREPARATION AND THE POLYMERIZATION OF CYCLIC ETHERS OVER THIS CATALYST

(75) Inventors: Stephan Schlitter, Limburgerhof (DE); Martin Haubner, Eppelheim (DE); Michael Hesse, Worms (DE); Stefan Käshammer, Schifferstadt (DE); Rolf Pinkos, Bad Dürkheim (DE); Christoph Sigwart, Schriesheim (DE)

(73) Assignee: BASF SE, Ludwigshafen (DE)

( * ) Notice: Subject to any disclaimer, the term of this patent is extended or adjusted under 35 U.S.C. 154(b) by 511 days.

(21) Appl. No.: 10/529,035

(22) PCT Filed: Sep. 12, 2003

(86) PCT No.: PCT/EP03/10149

§ 371 (c)(1),
(2), (4) Date: Mar. 24, 2005

(87) PCT Pub. No.: WO2004/030811

PCT Pub. Date: Apr. 15, 2004

(65) Prior Publication Data

US 2006/0046925 A1   Mar. 2, 2006

(30) Foreign Application Priority Data

Sep. 27, 2002   (DE) .................... 102 45 198

(51) Int. Cl.
*B01J 2/16*   (2006.01)
(52) U.S. Cl. .......................... 502/80; 502/84
(58) Field of Classification Search .......... 502/80, 502/84
See application file for complete search history.

(56) References Cited

U.S. PATENT DOCUMENTS

| | | | |
|---|---|---|---|
| 3,901,826 A * | 8/1975 | Hofstadt et al. ............ 502/83 |
| 4,127,513 A | 11/1978 | Bellis | |
| 4,189,566 A * | 2/1980 | Mueller et al. ............ 528/408 |
| 4,228,462 A | 10/1980 | van Straaten | |
| 4,243,799 A * | 1/1981 | Mueller et al. ............ 528/409 |
| 4,460,796 A | 7/1984 | Mueller | |
| 5,268,345 A | 12/1993 | Mueller | |
| 6,043,338 A | 3/2000 | Sigwart et al. | |
| 6,274,527 B1 | 8/2001 | Belbachir et al. | |
| 6,274,700 B1 | 8/2001 | Eller et al. | |
| 6,362,312 B1 * | 3/2002 | Eller et al. ............ 528/413 |
| 2004/0220381 A1 * | 11/2004 | Schlitter et al. ............ 528/408 |

FOREIGN PATENT DOCUMENTS

| | | |
|---|---|---|
| DE | 1 173 442 | 12/1960 |
| DE | 2 247 530 | 9/1972 |
| DE | 28 01 578 A1 | 7/1979 |
| DE | 195 27 532 A1 | 1/1997 |
| DE | 197 55 415 A1 | 6/1999 |
| DE | 198 01 462 A1 | 7/1999 |
| EP | 0 398 636 B1 | 11/1990 |
| EP | 0 535 515 A1 | 4/1993 |
| FR | 915.458 | 11/1946 |
| WO | WO-03/002631 A1 | 1/2003 |

OTHER PUBLICATIONS

Blatterstrukturen, Klockmanns Mineralogie, Aug. 16, 1978, pp. 739-765.

* cited by examiner

*Primary Examiner*—Elizabeth D Wood
(74) *Attorney, Agent, or Firm*—Connolly Bove Lodge & Hutz LLP

(57) ABSTRACT

The present invention relates to a solid, acid catalyst for the preparation of polytetrahydrofuran, polytetrahydrofuran copolymers, diesters or monoesters of these polymers by polymerization of tetrahydrofuran in the presence of at least one telogen and/or comonomer, which has a BET surface area of at least 160 m$^2$/g and an acid center density of at least 0.05 mmol/g for p$K_a$ values of from 1 to 6, to a process for preparing it and to a process for the polymerization of cyclic ethers over this catalyst.

4 Claims, No Drawings

CATALYST, ITS PREPARATION AND THE POLYMERIZATION OF CYCLIC ETHERS OVER THIS CATALYST

CROSS REFERENCE TO RELATED APPLICATION

The present application is a National Stage application of PCT/EP2003/010149, filed Sep. 12, 2003, which claims priority from German Patent Application No. DE 102 45 198.2, filed Sep. 27, 2002.

The present invention relates to an improved solid, acid catalyst for the ring-opening polymerization of cyclic ethers. Furthermore, the present invention relates to a process for preparing polytetrahydrofuran or polytetrahydrofuran derivatives over such catalysts and to a process for preparing such catalysts by acid activation.

Polytetrahydrofuran (hereinafter referred to as "PTHF"), also known as polyoxybutylene glycol, is a versatile intermediate in the plastics and synthetic fibers industry and is used, inter alia, as diol component for preparing polyurethane, polyester and polyamide elastomers. In addition, it is, like some of its derivatives, a valuable auxiliary in many applications, e.g. as dispersant or in the deinking of waste paper.

PTHF is usually prepared industrially by polymerization of tetrahydrofuran (hereinafter referred to as "THF") over suitable catalysts in the presence of reagents whose addition makes it possible to control the chain length of the polymer chains and thus set the mean molecular weight (chain termination reagents or "telogens"). The control is achieved by the choice of type and amount of the telogen. When appropriate telogens are selected, functional groups can additionally be introduced at one end or both ends of the polymer chain.

Thus, for example, the monoesters or diesters of PTHF can be prepared by using carboxylic acids or carboxylic anhydrides as telogens. PTHF itself is formed only by subsequent saponification or transesterification. This preparation is therefore referred to as a two-stage PTHF process.

Other telogens act not only as chain termination reagents, but are also incorporated into the growing polymer chain of PTHF. They not only have the function of a telogen but at the same time act as a comonomer and can therefore be referred to as telogens and as comonomers with equal justification. Examples of such comonomers are telogens having two hydroxy groups, for example dialcohols. These may be, for example, ethylene glycol, propylene glycol, butylene glycol, 1,3-propanediol, 1,4-butanediol, 2-butyne-1,4-diol, 2,2-dimethyl-1,3-propanediol, 1,6-hexanediol or low molecular weight PTHF.

Further suitable comonomers are cyclic ethers, preferably three-, four- and five-membered rings, e.g. 1,2-alkylene oxides, e.g. ethylene oxide or propylene oxide, oxetane, substituted oxetanes such as 3,3-dimethyloxetane, and THF derivatives such as 3-methyltetrahydrofuran, 3,3-dimethyltetrahydrofuran or 3,4-dimethyltetrahydrofuran.

The use of such comonomers or telogens leads, with the exception of water, 1,4-butanediol and low molecular weight PTHF, to the preparation of tetrahydrofuran copolymers, hereinafter referred to as THF copolymers, and in this way makes it possible to achieve chemical modification of PTHF.

Industrially, PTHF can be produced in a single stage by polymerisation of THF using water, 1,4-butanediol or low molecular weight PTHF as telogen over acid catalysts. Known catalysts include both homogeneous systems dissolved in the reaction system and heterogeneous, i.e. largely undissolved systems. However, a disadvantage is the relatively low THF conversions which are achieved, especially in the synthesis of PTHF having a molecular weight of from 650 to 3000.

On a large industrial scale, use is made predominantly of the abovementioned two-stage processes in which THF is firstly polymerized, e.g. in the presence of fluorosulfonic acid, to form polytetrahydrofuran esters and these are subsequently hydrolyzed to PTHF. This form of the THF polymerization usually achieves higher THF conversions than in the case of single-stage processes. Polymerization of THF in the presence of carboxylic anhydrides, e.g acetic anhydride, in the presence of acid catalysts to form PTHF diacetates and subsequent transesterification of the PTHF diacetates with, for example, methanol to give PTHF and methyl acetate is particularly advantageous.

The preparation of PTHF by polymerization of THF in the presence of carboxylic anhydrides or the preparation of THF copolymers by polymerization of THF in the presence of carboxylic anhydrides and cyclic ethers as comonomers over solid acid catalysts, as is preferred in the present patent application, is known.

DE-A-28 01 578 describes a process for preparing PTHF diacetates from THF in the presence of carboxylic anhydrides and a bleaching earth having a water content of <3% by weight as catalyst.

DE-A-198 01 462 describes acid-activated calcium montmorillonites having a specific surface area of at least 300 $m^2/g$, an acidity of at least 0.02 mmol/g for $pK_a$ values of <−3 and pore volumes of at least 0.4 $cm^3/g$ for pore sizes in the range 30-200 A as catalysts in powder or extrudate form for the polymerization of THF to give, inter alia, PTHF diacetates.

U.S. Pat. No. 4,228,462 describes a method of preparing copolymers of THF and alkylene oxides over acid-activated montmorillonites having pore volumes of 0.4-0.8 $cm^3/g$, average pore sizes in the range 0.1-0.3 μm and a surface area of 220-260 $m^2/g$.

In DE-A1-197 554 15, PTHF is prepared over a catalyst having a high proportion of montmorillonite. To prepare the catalyst, montmorillonite is exposed to an acid having a concentration of 2-100% for 0.5-24 hours at a temperature of 30-120° C. The catalyst is dried at 80-200° C. and calcined at 150-600° C. and has a BET surface area of at least 150 m2/g.

U.S. Pat. No. 6,274,527 discloses a catalyst based on acid-activated Algerian bentonites. The specific raw clay is activated by means of sulfuric acid having a concentration of 0.1-0.9 mol/l for up to 3 days at room temperature or 1-2 hours at elevated temperature, filtered, washed and dried.

U.S. Pat. No. 4,127,513 describes the preparation of PTHF copolymers over acid-activated montmorillonites which have an acid center density of 0.1-0.9 mmol/g at acid strengths ($pK_a$) in the range from −3 to −8. The raw clay is reacted with acids having a concentration of 15-40%, preferably at room temperature, to obtain the specific acidity properties.

Processes for preparing acid-activated clay minerals, in particular sheet silicates, are likewise known; an overview is given in EP-B 398 636 and the publications cited therein. Acid-activated bentonites are used on a large scale as bleaching earths for decolorizing oils.

The catalysts of the prior art display only a relatively low activity, which in an industrial plant leads to very large reactor volumes and/or very long reaction times. The economics of a heterogeneously catalyzed process for the polymerization of cyclic ethers, in particular THF, therefore depends critically on the productivity of the catalyst. It is an object of the present invention to provide a highly active catalyst for the preparation of polytetrahydrofuran, polytetrahydrofuran copolymers, diesters or monoesters of these polymers.

We have found that this object is achieved by a solid, acid catalyst for the preparation of polytetrahydrofuran, polytetrahydrofuran copolymers, diesters or monoesters of these polymers by polymerization of tetrahydrofuran in the presence of at least one telogen and/or comonomer, which has a BET surface area of at least 160 m$^2$/g, preferably at least 220 m$^2$/g and particularly preferably at least 260 m$^2$/g, and an acid center density of at least 0.05 mmol/g, preferably at least 0.15 mmol/g, particularly preferably at least 0.25 mmol/g, for pK$_a$ values of from 1 to 6, preferably in the range from 2.5 to 5.5.

The catalyst comprises a total amount of alkali-soluble and non-alkali-soluble SiO$_2$ of at least 20% by weight, preferably at least 30% by weight, in particular from 50 to 90% by weight, and at least one further oxide of an element selected from the group consisting of Al, Fe and the elements of groups IIIA to VIIA of the Periodic Table (groups designated in accordance with the old IUPAC nomenclature), preferably selected from among the group consisting of Al, Fe, Ti and Zr. Furthermore, the catalyst has a proportion of alkali-soluble SiO$_2$ (amorphous silica) of from 20 to 85% by weight, preferably from 25 to 75% by weight, in particular from 30 to 65% by weight.

Furthermore, the catalyst has a pore volume (BJH N$_2$ isotherms) of at least 0.2 cm$^3$/g, preferably at least 0.35 cm$^3$/g and particularly preferably at least 0.45 cm$^3$/g, for pore diameters in the range from 2 to 200 nm. The pore volume made up by pores having diameters in the range from 5 to 50 nm is at least 0.1 cm$^3$/g, preferably at least 0.2 cm$^3$/g, particularly preferably at least 0.25 cm$^3$/g. The mean BJH pore diameter (4V/A) for pore sizes of from 2 to 200 nm is from 2.0 to 10.0 nm, preferably from 3.5 to 9 nm.

As raw material for the catalyst of the present invention, preference is given to using clay minerals of the montmorillonite/saponite group or Palygorskite/sepiolite group, particularly preferably montmorillonites as described, for example, in Klockmanns Lehrbuch der Mineralogie, 16$^{th}$ edition, F. Euke Verlag 1978, pages 739-765. Montmorillonite-containing minerals are also referred to as bentonites or occasionally as Fuller's earths.

Suitable clay mineral sources are in principle all montmorillonite-containing deposits as are listed in, for example, the monograph "The Economics of Bentonite", 8$^{th}$ edition 1997, Roskill Information Services Ltd, London. The raw clays frequently comprise montmorillonite together with further mineral and nonmineral constituents. As mineral constituents, it is possible for, for example, quartz, feldspar, kaolin, muscovite, zeolites and titanium oxides, iron oxides, calcite and/or gypsum to be present in varying amounts. Preferred raw materials are those having a high montmorillonite content and a correspondingly low content of secondary constituents. The montmorillonite content can, for example, be determined via the determination of the methylene blue adsorption.

Preferred raw materials have a methylene blue value of at least 250 mg/g, preferably at least 290 mg/g, in particular at least 320 mg/g. Particularly preferred raw materials are those whose exchangeable cations are made up to a high percentage of alkali metals, in particular sodium. Based on charge equivalents, these raw materials contain at least 25%, preferably at least 40%, of monovalent exchangeable cations. These sodium bentonites as raw materials occur in nature; known sources of sodium-containing bentonites are located, for example, in Wyoming/USA or in India, and are also known on the basis of their origin as "Western bentonites" or "Wyoming bentonites" or on the basis of their properties as "swelling bentonites". Bentonites having a high proportion of alkaline earth metal cations, in particular calcium, are known, for example, as "subbentonites" or "Southern bentonites" and can be converted into sodium-containing bentonites by alkaline activation. Such alkali-activated raw materials are also suitable for the catalysts of the present invention. Finally, it is in principle also possible to prepare such raw materials synthetically.

Clay minerals of natural origin occasionally contain non-mineral impurities, in particular carbon compounds. As catalyst raw material, preference is given to those bentonites which have a total carbon content of less than 3% by weight, preferably less than 1% by weight, particularly preferably less than 0.5% by weight.

According to the present invention, the catalyst is prepared by subjecting the clay mineral, either in pelletized, lump or powder form to acid activation. During this activation, at least 50%, preferably at least 60% and particularly preferably at least 70%, of the acid used is reacted. Based on the catalyst raw material, from 3 to 15 milliequivalents, preferably from 4.5 to 12 milliequivalents, particularly preferably from 5 to 10 milliequivalents, of acid are reated per gram (meq/g) of raw clay used. For the purposes of the present invention, an equivalent (eq) of a substance is that amount which, in a defined reaction, combines with or liberates or replaces that amount of hydrogen which is bound to 3 g of carbon in $^{12}$CH$_4$. These figures are based on a dried raw clay having a high purity, i.e. having a loss on ignition of 15-20% and a methylene blue value of 300-400 mg/g. In the case of moister or drier raw clays or a lower purity, for example due to the presence of extraneous minerals, the amount of acid used and reacted per amount of clay has to be modified appropriately. The optimum amount of acid reacted in the activation is preferably determined for the particular raw material by means of preliminary tests.

The activation can be carried out using inorganic or organic acids. Preference is given to using hydrochloric acid and/or sulfuric acid or mixtures of hydrochoric acid and/or sulfuric acid with other inorganic or organic acids.

The proportion of raw clay in the activation suspension is from 2 to 50% by weight, preferably from 5 to 40% by weight and particularly preferably from 10 to 30% by weight. Relatively high crude clay concentrations are economically advantageous; the upper limit is imposed by the viscosity of the activation suspension.

In the case of the preferred use of sulfuric acid for the activation, the acid conversions in the activation are from 50 to 90%, preferably from 60 to 80%; in the case of the likewise preferred use of hydrochloric acid for the activation, the conversions are from 70 to 100%, preferably from 85 to 95%.

The total amount of acid to be used can easily be calculated from the proportion of raw clay in the activation suspension and the desired percentage and absolute acid conversion. The acid used for the activation can be placed in the reaction vessel at the beginning of the activation or can be added; it is preferably added in a plurality of steps at the beginning and during the activation. As a result of the preferred addition of the acid in a plurality of steps, the acid is present in a lower concentration at the start of the activation than would be the case if the total amount of acid were added at the beginning of the activation. The concentration of acid at the beginning of the activation is less than 4 eq/kg of suspension, preferably less than 2.5 eq/kg of suspension and particularly preferably from 0.5 to 1.5 eq/kg of suspension.

A critical factor for the selection of the combination of temperature and time for successfully carrying out the process of the present invention is the achievement of the acid conversions specified according to the present invention. Preference is given to using temperatures of at least 60° C. at activation times of at least 4 hours, in particular temperatures of at least 70° C. at activation times of at least 24 hours and particularly preferably temperatures of at least 80° C. at activation times of at least 36 hours.

After the acid activation is complete, the catalyst is separated off from the mother liquor and freed of adhering acid residues using methods known to those skilled in the art. For this purpose, the activation suspension can firstly be separated from the major part of the mother liquor by, for example, filtration, centrifugation or sedimentation and decantation, with preference being given to filtration and centrifugation. The catalyst is subsequently freed of the remaining mother liquor and adhering acid residues by washing with a solvent, preferably demineralized water. The washing process can be carried out continuously, for example in filter presses, or batchwise, for example by repeated suspension/decantation. The washing medium can be given a slightly acidic pH by small additions of acid in order to reduce adsorption of basic trace components from the washing medium on the catalyst. Preference is given to using aqueous nitric acid having a pH of 2-5 for this purpose. The washing times can be shortened by using the solvent at a higher temperature. Washing medium having a low level of contamination obtained toward the end of the washing process can be reused at the commencement of washing of a further batch.

After washing, the catalyst preferably contains little if any free acid, i.e. little if any residues of the acid used for the activation remain in the catalyst. It is preferred that less than 20%, particularly preferably less than 5%, of the total acid centers are present in the form of free acid on the catalyst. The proportion of free acid on the catalyst can be reduced to values according to the present invention by means of the washing process.

After separating off and washing out the mother liquor, the catalyst is dried, if desired at elevated temperature and/or reduced pressure and/or by passing dry gases such as air or nitrogen through it and/or by slurrying and spray drying it. The catalyst is preferably dried at from 30° C. to 200° C., under atmospheric or subatmospheric pressure. The catalyst can subsequently be calcined at from 150° C. to 800° C., preferably from 250° C. to 600° C.

The catalyst can be used in the polymerization reaction in powder form or preferably as shaped bodies. The production of shaped bodies from pulverulent raw materials can be carried out by methods known to those skilled in the art, for example tableting, agglomeration or extrusion, as are described, inter alia, in the Handbook of Heterogenous Catalysis, Vol. 1, VCH Verlagsgesellschaft Weinheim, 1997, pp. 414-417. In the shaping procedure, auxiliaries known to those skilled in the art, e.g. binders, lubricants and/or solvents, can be added. It is equally possible to shape the raw clay and activate it as shaped bodies or to carry out an activation of powders and shape the activated powder. Finally, it is also possible to activate raw material in the form of lumps or pieces and to use it as catalyst in this form. The acid activation of pulverulent raw materials and, if desired, subsequent shaping is preferred.

The catalysts of the invention can be used for the polymerization in the form of, for example, pellets, extrudates, spheres, rings or granules. Suitable shaped bodies and ways of producing them are described in DE 10130782. Preference is given to using pellets, extrudates or spheres as shaped bodies. In the case of spheres, diameters of from 0.1 to 10 mm, preferably from 0.3 to 5 mm, are utilized. Pellets used preferably have diameters of from 1 to 5 mm and heights of from 1 to 3 mm. In the case of extrudates, use is made of those having a diameter in the range 0.5-4 mm, preferably 1-3 mm. The ratio of length to diameter of the preferred extrudates is usually from 20:1 to 0.5:1, preferably from 5:1 to 1:1. Apart from cylindrical extrudates, it is also possible to use, for example, hollow extrudates, ribbed extrudates, star extrudates or other extrudate shapes known to those skilled in the art.

As a pretreatment of the catalyst prior to use in the polymerization reaction, it is possible to employ, for example, drying by means of gases heated to from 80 to 200° C., preferably from 100 to 150° C., e.g. air or nitrogen.

Suitable telogens for the preparation of PTHF esters are carboxylic anhydrides or carboxylic anhydride/carboxylic acid mixtures. Among these, preference is given to aliphatic and aromatic polycarboxylic and/or monocarboxylic acids or their anhydrides which contain from 2 to 12 carbon atoms. Examples of preferred telogens are acetic anhydride, propionic anhydride, succinic anhydride and maleic anhydride, in the presence or absence of the corresponding acids. Particular preference is given to acetic anhydride as telogen.

The PTHF acetates formed when using the preferred telogens can be converted into PTHF by various methods, for example by the method described in U.S. Pat. No. 4,460,796.

Other copolymers of THF can be prepared by the additional use of cyclic ethers which are able to undergo ring-opening polymerization, preferably three-, four- and five-membered rings such as 1,2-alkylene oxides, e.g. ethylene oxide or propylene oxide, oxetane, substituted oxetanes such as 3,3-dimethyloxetane, and THF derivatives such as 3-methyltetrahydrofuran, 3,3-dimethyltetrahydrofuran or 3,4-dimethyltetrahydrofuran, particularly preferably 3-methyltetrahydrofuran, as comonomers.

The telogen and, if desired, the comonomer is preferably introduced into the polymerization as a solution in THF. Since the telogen leads to chain termination or to chain transfer in the polymerization, the mean molecular weight of the polymer can be controlled via the amount of telogen used. The more telogen present in the reaction mixture, the lower the mean molecular weight of the PTHF or the PTHF derivative concerned. PTHF, PTHF derivatives or THF copolymers having mean molecular weights of from 250 to 10000 dalton can be prepared in a targeted fashion as a function of the telogen content of the polymerization mixture. The process of the present invention is preferably used to prepare PTHF, PTHF derivatives or THF copolymers having mean molecular weights of from 500 to 5000 dalton, particularly preferably from 650 to 4000 dalton.

The polymerization is generally carried out at from 0 to 80° C., preferably at temperatures from 25° C. to the boiling point of THF. The pressure employed is generally not critical to the result of the polymerization, which is why the polymerization is generally carried out at atmospheric pressure or under the autogenous pressure of the polymerization system. Exceptions to this are copolymerisation of THF with volatile 1,2-alkylene oxides, which are advantageously carried out under superatmospheric pressure. The pressure is usually from 0.1 to 20 bar, preferably from 0.5 to 2 bar.

To avoid the formation of ether peroxides, the polymerization is advantageously carried out under an inert gas atmosphere. As inert gases, it is possible to use, for example, nitrogen, carbon dioxide or the noble gases; preference is given to using nitrogen.

The polymerization is particularly advantageously carried out under a hydrogen atmosphere. This embodiment gives a particularly low color number of the polymers formed. The hydrogen partial pressure can in this case be in the range from 0.1 to 50 bar. When the polymerization is carried out in the presence of hydrogen, doping of the polymerization catalyst with transition metals or mixing the polymerization catalyst with a catalyst comprising transition metals makes it possible to achieve a further improvement in the color number. Transition metals employed are the elements of groups VIIA to VIIIA of the Periodic Table, for example ruthenium, rhenium, nickel, iron, cobalt, palladium and/or platinum.

The process of the invention can be carried out batchwise or continuously, with the continuous mode of operation generally being preferred for economic reasons.

In the batchwise mode of operation, the reactants THF, the appropriate telogen and/or, if desired, the comonomer and the catalyst are generally reacted in a stirred vessel or loop reactor at the temperatures indicated until the desired conversion of THF has been achieved. Depending on the amount of catalyst added, the reaction time can be from 0.5 to 40 hours, preferably from 1 to 30 hours. The catalysts are generally added to the polymerization in an amount of from 1 to 90% by weight, preferably from 4 to 70% by weight and particularly preferably from 8 to 60% by weight, based on the weight of the THF used.

In the continuous mode of operation, the reaction can be carried out in the suspension or fixed-bed mode in conventional reactors or reactor assemblies suitable for continuous processes, for example in loop reactors or stirred reactors in the case of a suspension process and in tube reactors or fixed-bed reactors in the case of a fixed-bed process, with preference being given to a fixed-bed process.

In the preferred fixed-bed mode of operation, the polymerization reactor can be operated in the upflow mode, i.e. the reaction mixture is passed from the bottom upwards, or in the downflow mode, i.e. the reaction mixture is passed through the reactor from the top downward. The feed comprising THF and telogen and/or comonomer is fed continuously into the polymerization reactor, with the space velocity over the catalyst being from 0.01 to 2.0 kg of THF/(1*h), preferably from 0.02 to 1.0 kg of THF/(1*h) and particularly preferably from 0.04 to 0.5 kg of THF/(1*h).

Furthermore, the polymerization reactor can be operated in a single pass, i.e. without product recirculation, or in the circulation mode, i.e. part of the polymerization mixture leaving the reactor is circulated. In the circulation mode, the ratio of recycle to feed is less than or equal to 150:1, preferably less than 100:1 and particularly preferably less than 60:1.

The concentration of the carboxylic anhydride used as telogen in the feed mixture fed into the polymerization reactor is from 0.03 to 30 mol %, preferably from 0.5 to 20 mol %, particularly preferably from 1 to 12 mol %, based on the THF used.

If a carboxylic acid is additionally used, the molar ratio of this carboxylic anhydride in the feed is usually from 1:20 to 1:20000.

If additional comonomers are used, the molar ratio of these to THF in the feed is usually from 0.1 to 60 mol %, preferably from 0.5 to 50 mol %, particularly preferably from 2 to 40 mol %.

If the polymerization is carried out in a suspension process, the work-up of the polymerization product mixture is carried out by separating off the major part of the polymerization catalyst from the polymerization mixture, for example by filtration, decantation or centrifugation, and passing the resulting polymerization product mixture to further work-up In the preferred fixed-bed mode, the polymerization product mixture is subjected directly to the further work-up.

The work-up of the particularly preferred PTHF acetates or THF copolymer acetates can be carried out by methods known per se. For example, unreacted THF and, as appropriate, acetic anhydride, acetic acid and comonomer are firstly separated off by distillation and the resulting PTHF acetate or THF copolymer acetate are transesterified with methanol in the presence of a basic catalyst to give PTHF or THF copolymer and methyl acetate.

If desired, low molecular weight PTHF and/or tetrahydrofuran copolymer having a mean molecular weight of from 200 to 700 dalton can subsequently be separated off by distillation. Low molecular weight cyclic oligomers are usually also separated off by distillation at this stage. PTHF or THF copolymer having a mean molecular weight of from 650 to 10,000 dalton remains as distillation residue.

The catalysts of the present invention can be regenerated after use in a batch or continuously operated PTHF process, for example by thermal treatment as described in EP-A-0 535 515, and/or by washing the catalyst with aqueous and/or organic solvents.

The invention is illustrated by the examples below.

EXAMPLES

The specific surface area of the catalysts was measured by nitrogen adsorption (BET multipoint method) in accordance with DIN 66131.

The mesoporosity and the mesopore distribution of the catalysts was determined by nitrogen desorption (BJH $N_2$ isotherm method) in accordance with DIN 66134. The data were evaluated in the pore diameter range from 2 nm to 200 nm. References to maxima in the pore radius distribution are based on a logarithmic plot of the pore radius.

The porosity of shaped catalyst bodies was determined by mercury intrusion in accordance with DIN 66133. The data were evaluated in the pore radius range from 20A to 10 μm.

The methylene blue adsorption was carried out by the spot analysis method as described in the leaflet "Bindemittelprüfung/Prüfung von Bindetonen" of the Vereins Deutscher Giessereifachleute (VDG) (draft P 69 E of June 1998).

The analysis of the concentration of acid centers in the catalyst was carried out by titration in aqueous solution. For this purpose, from 1 to 2 g of catalyst were weighed out, suspended in 100 ml of 0.1 mol/l sodium nitrate solution and titrated with 0.1 mol/l sodium hydroxide solution while stirring continually. Between two addition steps, it was necessary to wait for a sufficient time for a constant pH to be established (about 5 min). The concentration of the acid centers and the associated $pK_a$ values can be read off from the plot of the pH versus the amount of sodium hydroxide added. In the examples, the acid center density reported is that to the equivalence point which can be observed in the titration curve at a pH of about 5-7.

To determine the proportion of alkali-soluble silicon dioxide, 1 g of dried catalyst powder were admixed with 100 ml of sodium carbonate solution (2% by weight) and boiled for 10 minutes. The supernatant solution was decanted off and fines were filtered off by means of a suction filter. The residue was boiled twice more with 25 ml of sodium carbonate solution for 2 minutes and once again decanted and filtered. The residue was finally placed on the suction filter and washed with hot sodium carbonate solution. The combined filtrates were made up to 0.5 l and analyzed for their sodium silicate content.

For the analysis of the acid conversion, the proton concentration remaining in the suspension after the activation was determined by titration and expressed as a ratio to the amount of acid used. The end point was determined by conductivity measurements (conductometrically), since pH titrations measure not only the remaining activation acid but also acidic cations and are therefore unsuitable for this purpose.

The determination of the exchangeable cations in the raw clay was carried out by ion exchange with ammonium. For this purpose, 30 g of dried clay were refluxed with 300 g of $NH_4Cl$ solution (2 mol/kg) for 2 hours. After a further period of 16 hours, the clay was separated off and washed with 0.5 l of deionized water. The mother liquor and the washings were made up to 1 l and the cations present (Na, K, Mg, Ca) were determined by elemental analysis. The ratio of the alkali metal ions to alkaline earth metal ions (total Na+K or Mg+Ca in equivalents) indicates whether the clay is a sodium bentonite (ratio of about 1 or above) or a calcium bentonite (ratio significantly less than 1).

The productivity of the catalyst (g of PTHF diacetate/g of catalyst *h) in powder form was determined as follows:

200 g of tetrahydrofuran and 20 g of acetic anhydride were placed in a 250 ml flask and heated to 50° C. While stirring vigorously, 2-3 g of a finely powdered catalyst which had been dried at 120° C. and had particle sizes of at least 100 μm were added and the reaction mixture was stirred vigorously at 50° C. for a further period. 20 ml samples of the reaction mixture were taken after 45 minutes, 2 hours, 4 hours and 6 hours and promptly separated from the catalyst powder by filtration. The samples which had been freed of catalyst were analyzed for PTHF diacetate, e.g. by separating off the low boilers by distillation and weighing the PTHF diacetate. The productivity of the catalyst powder was determined by extrapolation of the time dependence of PTHF diacetate formation.

The examples of productivity determination described can easily be adapted in respect of type and amount of telogens and/or comonomers, temperature, pressure, etc., to the respective use conditions of the catalyst. Variation of catalyst amounts and reaction times additionally enables the experiments to be easily modified to give various high initial productivities.

Example 1

A raw bentonite from Wyoming displayed the following characteristics: methylene blue adsorption: 310 mg/g; ratio of equivalents of exchangeable alkali metali cations to alkaline earth metal cations: 1.1; BET surface area: 34 m²/g. Composition data found were: 9% by weight of moisture; 15% by weight loss on ignition; 25.3% by weight of Si; 9.5% by weight of Al; 2.5% by weight of Fe; 1.5% by weight of Na; 1.2% by weight of Mg and 1.0% by weight of Ca.

90 g of this raw bentonite were suspended in 300 g of hydrochloric acid having a concentration of 0.75 mol/kg and the suspension was stirred at 100° C. for 24 hours. A further 53 g of concentrated hydrochloric acid (32% strength by weight) were subsequently added and the mixture was stirred for a further 24 hours at 100° C. During the total activation time, 7.3 mmol of hydrochloric acid were consumed per g of raw clay.

After suction filtration, washing with deionized water and drying at 120° C., the catalyst displays an acid center density of 0.37 mmol/g, a BET surface area of 227 m²/g and a productivity in the polymerization test of 13 g/g*h.

Example 2

A raw bentonite of Indian origin displayed the following characteristics: methylene blue adsorption: 404 mg/g; ratio of equivalentts of exchangeable alkali metal cations to alkaline earth metal cations: 1.1; BET surface area: 116 m²/g. Composition data found were: 14% by weight of moisture; 20% by weight loss on ignition; 22.4% by weight of Si; 8.9% by weight of Al, 6.8% by weight of Fe; 1.3% by weight of Na; 1.1% by weight of Mg and 0.1-1% by weight each of Ca, Ti and Mn.

20 kg of this raw bentonite were suspended in 66.6 kg of sulfuric acid having a concentration of 0.75 mol/kg and the suspension was stirred slowly at 95-98° C. for 24 hours. 16 kg of half-concentrated sulfuric acid (50% strength by weight) were subsequently added and stirring was continued at 95-98° C. for a further 24 hours. The suspension was diluted with 70 l of deionized water, filtered in a filter press and the solid was washed with about 700 l of deionized water. The filter cake was subsequently resuspended in 32 l of dilute nitric acid (1% strength by weight), filtered again and washed with 900 l of deionized water. Drying gave 12.5 kg of catalyst powder having an acid center density of 0.40 mol/g and a productivity in the polymerization test of 15 g/g*h. The catalyst contained 70.6% by weight of $SiO_2$; 10.8% by weight of $Al_2O_3$ and 4.6% by weight of $Fe_2O_3$. The catalyst contained 58% by weight of alkali-soluble $SiO_2$. The BET surface area is 403 m²/g and the BJH-$N_2$ pore volume is 0.59 cm³/g, of which 0.33 cm³/g is made up by pores in the diameter range from 5 to 50 nm.

Example 3

210 g of the raw bentonite from Example 2 were suspended in 700 g of hydrochloric acid having a concentration of 1.0 mol/kg and the suspension was stirred at 100° C. for 24 hours. A further 105 g of concentrated hydrochloric acid (32% strength by weight) were subsequently added and the mixture was stirred for a further 24 hours at 100° C. During the total activation time, 8.2 mmol of hydrochloric acid were consumed per g of raw clay.

After suction filtration, washing with deionized water and drying at 120° C., the catalyst displays an acid center density of 0.44 mmol/g, a BET surface area of 370 m²/g and a productivity in the polymerization test of 15 g/g*h.

Example 4

35 g of the raw bentonite from Example 2 were suspended in 700 ml of hydrochloric acid having a concentration of 0.6 mol/l and the suspension was stirred at 100° C. for 72 hours. During the activation, about 8 mmol of hydrochloric acid are consumed per g of raw clay. After suction filtration, washing with deionized water and drying at 120° C., the catalyst displays an acid center density of 0.38 mmol/g, a BET surface area of 357 m²/g and a productivity in the polymerization test of 16 g/g*h.

Example 5

A raw bentonite of Bavarian origin which has been preactivated using sodium carbonate displays the following characteristics: methylene blue adsorption: 260 mg/g; ratio of equivalents of exchangeable alkali metali cations to alkaline earth metal cations: 0.9; BET surface area: 84 m²/g. Composition data found were: 9% by weight of moisture; 14% by weight loss on ignition; 25.4% by weight of Si; 9.0% by weight of Al, 3.5% by weight of Fe; 1.7% by weight of Mg; 1.2% by weight of Na; 1.2% by weight of Ca and 0.3% by weight of Ti.

90 g of this raw bentonite were suspended in 300 g of hydrochloric acid having a concentration of 0.75 mol/l and the suspension was stirred at 100° C. for 24 hours. A further 63.6 g of concentrated hydrochloric acid (32% strength by weight) were subsequently added and the mixture was stirred for a further 24 hours at 100° C. During the total activation time, 8.2 mmol of hydrochloric acid were consumed per g of raw clay.

After suction filtration, washing with deionized water and drying at 120° C., the catalyst displays an acid center density of 0.26 mmol/g, a BET surface area of 312 m$^2$/g and a productivity in the polymerization test of 10 g/g*h.

Comparative Example I 150 g of the raw bentonite from Example 2 were suspended in 500 g of hydrochloric acid having a concentration of 3 mol/kg and the suspension was stirred for one hour. 0.4 mmol of acid were reacted per gram of clay used. The activated clay was filtered off with suction, washed free of chloride and dried at 120° C. The catalyst displays an acid center density of 0.55 mmol/g and a BET surface area of 137 m2/g. The productivity of the catalyst powder in the polymerization test was 4 g/g*h.

Comparative Example II 150 g of a raw bentonite corresponding to Example 2 were suspended in 500 g of hydrochloric acid having a concentration of 4.5 mol/kg and the suspension was stirred at 100° C. for 72 hours. The activated clay was filtered off with suction, washed free of chloride and dried at 120° C. The catalyst displays an acid center density of about 0.02 mmol/g. The productivity of the catalyst powder in the polymerization test was 0.5 g/g*h.

Example 6

Continuous Polymerization 300 g of a catalyst which had been acid-activated using a method analogous to Example 3 were kneaded with 275 ml of water in a laboratory kneader for 10 minutes, subsequently extruded to give extrudates having a diameter of 2.5 mm, dried and finally calcined at 350° C. The catalyst displays a mercury porosity of 0.45 cm$^3$/g.

In a laboratory apparatus, a mixture of THF and acetic anhydride (6.9% based on the total feed) was passed at 45° C. under protective gas over this catalyst which had been pre-dried at 140° C. and was arranged as a fixed bed in a 250 ml reactor (internal diameter: 40 mm). The space velocity over the catalyst was 0.2 kg of feed/(1 of cat.*h). The reactor was operated with product recirculation (about 1 l/h). To work-up the PTHF diacetate, the reaction mixture obtained was freed of unreacted THF and acetic anhydride by distillation. The degree of evaporation was about 56%, and the molecular weight of the PTHF diacetate (Mn) was 850-900 g/mol.

We claim:

1. A solid, acid catalyst for the preparation of polytetrahydrofuran, polytetrahydrofuran copolymers, and diesters or monoesters of these polymers, by polymerization of tetrahydrofuran in the presence of at least one telogen and/or comonomer, said catalyst comprising a clay material which comprises at least 20% by weight of SiO$_2$ and at least one further oxide of an element selected from the group consisting of Al, Fe and the elements of groups III A to VII A of the Periodic Table, and wherein said catalyst further comprises a proportion of alkali-soluble silicon dioxide of from 20 to 85% by weight, where the catalyst has been calcined at from 150 to 800° C. and has an N$_2$ pore volume of at least 0.35 cm$^3$/g for pore diameters in the range from 2 to 200 nm, with at least 0.2 cm$^3$/g of this N$_2$ pore volume being made up by pores having diameters in the range 5-50 nm and the mean BJH pore diameter (4V/A) of the pores in the range from 2 to 200 nm being from 2.0 to 10.0 nm, has a BET surface area of at least 160 m$^2$/g and has an acid center density of at least 0.25 mmol/g for pK$_a$ values of from 1 to 6.

2. A catalyst as claimed in claim 1, wherein the clay material has a methylene blue value of at least 250 mg/g.

3. A catalyst as claimed in claim 1, wherein the clay mineral is a sodium bentonite.

4. A catalyst as claimed in claim 2, wherein the clay mineral is a sodium bentonite.

* * * * *